US010081495B2

(12) United States Patent
Møller

(10) Patent No.: US 10,081,495 B2
(45) Date of Patent: Sep. 25, 2018

(54) MODULAR TRANSPORT SYSTEM AND A METHOD FOR MOVING GOODS AROUND IN A MODULAR TRANSPORT SYSTEM

(71) Applicant: FlexAgile Systems ApS, Højbjerg (DK)

(72) Inventor: Philip Møller, Højbjerg (DK)

(73) Assignee: ROBOT LOGISTICS APS, Højbjerg (DK)

(*) Notice: Subject to any disclaimer, the term of this patent is extended or adjusted under 35 U.S.C. 154(b) by 0 days.

(21) Appl. No.: 15/112,356

(22) PCT Filed: Jan. 15, 2015

(86) PCT No.: PCT/DK2015/050010
§ 371 (c)(1),
(2) Date: Jul. 18, 2016

(87) PCT Pub. No.: WO2015/106765
PCT Pub. Date: Jul. 23, 2015

(65) Prior Publication Data
US 2016/0340125 A1 Nov. 24, 2016

(30) Foreign Application Priority Data

Jan. 17, 2014 (DK) .................................. 2014 70021

(51) Int. Cl.
*B65G 17/32* (2006.01)
*B65G 35/06* (2006.01)
(Continued)

(52) U.S. Cl.
CPC ............. *B65G 35/06* (2013.01); *B65G 13/10* (2013.01); *B65G 23/08* (2013.01); *B65G 37/02* (2013.01);
(Continued)

(58) Field of Classification Search
CPC ..................................................... B65G 39/025
(Continued)

(56) References Cited

U.S. PATENT DOCUMENTS 3,645,379 A * 2/1972 Kornylak ............... B65G 13/07
193/37
3,888,342 A * 6/1975 Geller .................... B65G 13/10
193/36
(Continued)

FOREIGN PATENT DOCUMENTS

DE 102004022060 A1 12/2005
DE 102009026388 A1 2/2011
(Continued)

OTHER PUBLICATIONS

International Search Report for corresponding application PCT/DK2015/050010 filed Jan. 1, 2015; dated Mar. 18, 2015.
(Continued)

*Primary Examiner* — William Ray Harp
(74) *Attorney, Agent, or Firm* — Cantor Colburn LLP

(57) ABSTRACT

A modular transport system for transporting goods around the system on transport trays, including two or more transport modules arranged side-by-side so that an upper side of the modules together form a transport plane, where each of the modules includes one or more multidirectional drives for transporting the trays in substantially any direction in the transport plane and the trays and the modules include tray orientation detectors for detecting the orientation of the tray in relation to the modules.

15 Claims, 5 Drawing Sheets

Figure 1:
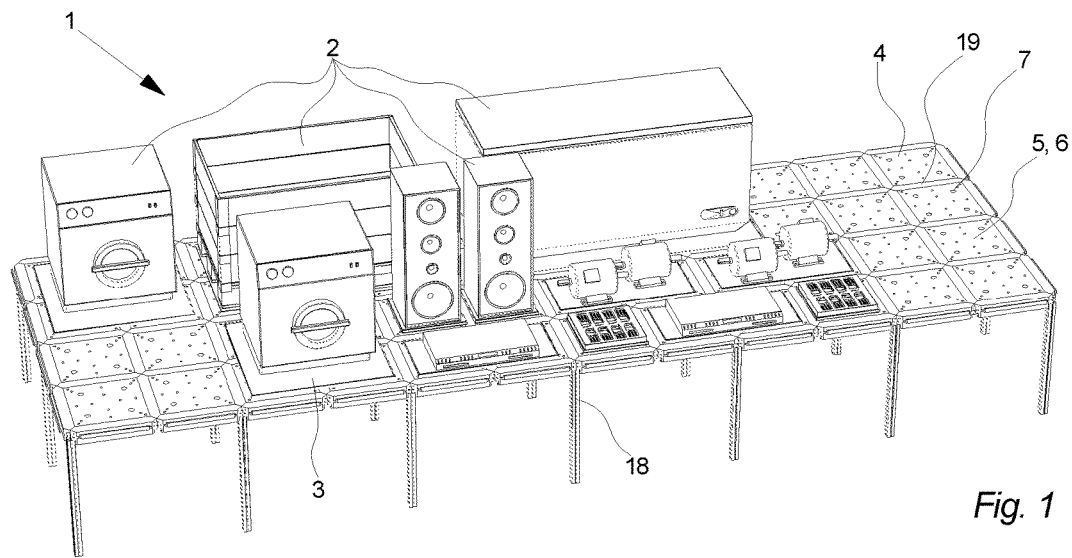

(51) Int. Cl.
*B65G 37/02* (2006.01)
*B65G 43/10* (2006.01)
*B65G 13/10* (2006.01)
*B65G 23/08* (2006.01)
*B65G 39/02* (2006.01)

(52) U.S. Cl.
CPC ........... *B65G 39/025* (2013.01); *B65G 43/10* (2013.01); *B65G 2207/34* (2013.01)

(58) Field of Classification Search
USPC .................................................. 198/373, 443
See application file for complete search history.

(56) References Cited

U.S. PATENT DOCUMENTS

| | | | | |
|---|---|---|---|---|
| 5,009,304 A | * | 4/1991 | Schmalzl | B65G 13/10 198/371.3 |
| 5,147,032 A | * | 9/1992 | Rombouts | B65G 39/025 193/35 MD |
| 5,150,781 A | | 9/1992 | Deisenroth | |
| 5,261,526 A | * | 11/1993 | Rombouts | B65G 13/071 193/35 MD |
| 5,890,582 A | * | 4/1999 | McKinnon | B65G 13/071 193/35 MD |
| 6,694,220 B1 | * | 2/2004 | Tanz | B65G 1/0478 198/369.4 |
| 6,762,382 B1 | * | 7/2004 | Danelski | B07C 5/36 198/370.04 |
| 8,567,587 B2 | * | 10/2013 | Faist | B65G 1/0478 198/370.09 |
| 8,655,484 B2 | * | 2/2014 | Stoll | B65G 43/10 700/213 |
| 8,675,018 B2 | * | 3/2014 | Mishra | B65G 13/10 345/629 |
| 9,630,781 B1 | * | 4/2017 | Ogle, II | B65G 39/025 |
| 2003/0141169 A1 | | 7/2003 | Reznik | |
| 2012/0004766 A1 | | 1/2012 | Stoll | |
| 2012/0031732 A1 | | 2/2012 | Harrington | |
| 2013/0166062 A1 | | 6/2013 | Casey | |
| 2013/0313073 A1 | | 11/2013 | Huber | |

FOREIGN PATENT DOCUMENTS

| | | |
|---|---|---|
| EP | 0563824 A2 | 10/1993 |
| EP | 0826611 A1 | 3/1998 |
| EP | 1375389 A1 | 1/2004 |
| GB | 971347 | 5/1962 |
| WO | 0076887 A1 | 12/2000 |
| WO | 2012052017 A2 | 4/2012 |

OTHER PUBLICATIONS

Written Opinion for corresponding application PCT/DK2015/050010 filed Jan. 1, 2015; dated Mar. 18, 2015.

* cited by examiner

MODULAR TRANSPORT SYSTEM AND A METHOD FOR MOVING GOODS AROUND IN A MODULAR TRANSPORT SYSTEM

BACKGROUND OF THE INVENTION

The invention relates to a modular transport system for transporting goods around the system on transport trays. The invention further relates to a method for moving goods around in a modular transport system.

DESCRIPTION OF THE RELATED ART

Systems for internal transport such as conveyers for transporting goods between different processing stations, luggage handling in airports, mailroom system or other are usually made from off-the-shelf and/or customised conveyers.

These systems are typically fairly efficient for the specific use they are designed but as soon as the basis on which these systems are designed changes e.g. due to change in capacity, use or other these systems often prove to be very inflexible and expensive to modify.

Thus, from US 2012/0004766 A1 it is known to form a transport system by means of a number of intercommunicating transport modules, wherein the modules comprises means for transporting goods both back and forth and to the left and right. Even though such a system is relatively flexible and can relatively easily be modified and/or expanded the system has a relatively low capacity.

An object of the invention is therefore to provide for a cost-efficient transport system and an advantageous technique for moving goods around in a transport system.

THE INVENTION

The invention provides for a modular transport system for transporting goods around the system on transport trays. The transport system comprises two or more transport modules arranged side-by-side so that an upper side of the modules together form a transport plane. Each of the modules includes one or more multidirectional drive means for transporting the trays in substantially any direction in the transport plane and the trays and the modules comprises tray orientation detection means for detecting the orientation of the tray in relation to the modules.

Providing the modules with tray orientation detection means is advantageous in that the capacity of the system hereby can be increased, in that the tray orientation detection means enables that the orientation of the trays can be changed on the fly—i.e. during transportation—so than once the tray reaches its destination it is delivered also in the right orientation—thus, further increasing the flexibility of the modular system.

Also, in a transport system as disclosed in US 2012/0004766 A1 where the goods is always transported in straight lines from one module to another—due to the inherent limitation in transport direction—the goods will always be orientated in the same direction. And even if power is lost and a loaded system is restarted from scratch the orientation of the goods is always know and always predictable.

However, transporting a tray on transport modules that are able to move the tray in any direction entails that the goods—and trays—are not always traveling in a straight line and are therefore affected by much more complex forces—such as centrifugal force. Thus, in the present transport system the orientation of the goods and trays is not necessary constant and particularly not during a power loss. Thus, it is advantageous to provide the trays and the modules of the present transport system with tray orientation detection means so that the orientation of the tray can be detected when needed.

Furthermore, particularly in a modular—and thus flexible and changing—transport system, where the modular design of the transport system allows much more optimal use of the given floor space it is advantageous that the orientation of the goods constantly can be changed—a function inherent in the multidirectional drive means—and thus constantly can be controlled by the tray orientation detection means.

And transporting the goods on trays is advantageous in that the trays can be standardised and thus provide a uniform physical and communicative interface with the transport modules and the rest of the transport system.

It should be noted that the term "transport trays" in this context should be interpreted as any kind of substantially flat-bottomed device being suitable for transporting goods around in a transport system. Thus, the term does not exclude that the tray may comprise fixtures, shelves, stands, racks, frames, fixtures or similar devices for holding and/or supporting the goods during transport and/or processing.

It should be noted that the term "multidirectional drive means" in this context should be interpreted as any kind of multidirectional drive capable of transporting the trays in substantially any direction in the transport plane. Multidirectional is also sometimes referred to as omnidirectional. Examples of such multidirectional driving devices includes driven wheels provided with rollers along the periphery mounted in different drive directions, multidirectional driving balls, conveyer means mounted on turntables and other devices suitable for driving the trays in any direction in the transport plane.

It should be noted that the term "tray orientation detection means" in this context should be interpreted as any kind sensor system, physical system, visual system or other suited detectors for detecting the orientation of the tray either constantly, regularly or on request.

In an aspect of the invention, said trays and/or said modules comprises position detection means for detecting the position of said transport tray in said transport system.

In a modular transport system where trays can be transported in any direction and where the trays are not only transported linearly but are also describing curves it is advantageous to be able to detect the current position of the trays both to make sure that they do not collide but also to make sure that they are on the right track to their destination.

In an aspect of the invention, said trays comprise a passive part of said tray orientation detection means and wherein said transport modules comprise an active part of said tray orientation detection means.

Most feasible tray orientation detection means—such as an inductive sensor detecting on a metal disc, an acoustic sensor detecting a specific volume or space, a visual sensor detecting a specific pattern, Hall effect sensor detecting a magnet and similar detectors all comprise an active part—usually some kind of sensor—and a passive part—usually some kind of metal block, magnet, pattern, shape or other—and since the tray is constantly moving around the transport system and since the position of the modules are relatively fixed it is advantageous to make the trays comprise the passive part of the tray orientation detection means and make the transport modules comprise the active part of the tray orientation detection means.

In an aspect of the invention, each of said modules includes two or more multidirectional drive means and wherein at least two of said two or more multidirectional drive means are driven by the same motor.

Providing each of the transport modules with more than one multidirectional drive means is advantageous in that it enables a number of synergetic effects including enabling that the same motor can at least assist in driving more than one multidirectional drive means.

In an aspect of the invention, said one or more multidirectional drive means comprises multidirectional driving balls.

Multidirectional driving balls includes a ball or at least a spherical ball part being driven by one or more motors enabling that an object touching the apex of the ball can be moved in any direction depending on the given rotational direction of the ball. Such ball drives are advantageous in relation with the present transport system in that they are relatively inexpensive, easy to implement and highly flexible.

In an aspect of the invention, said multidirectional driving balls comprises a hollow spherical ball part including at least one motor arranged to drive said ball part through an inside surface of said hollow spherical ball part.

By driving the rotation of the spherical ball part on an inside surface of the ball the drive is better protected and the multidirectional driving balls can be designed more compact.

In an aspect of the invention, said transport modules comprise one or more, preferably two or more axis of symmetry in said transport plane.

Forming the transport modules with one or more and preferably two or more axis of symmetry in the transport plane—such as square, rectangular, hexagonal—is advantageous in that it hereby is easier to form a compact and efficient transport system where modules easily can be exchanged.

In an aspect of the invention, said transport system comprises a plurality of transport modules arranged side-by-side to form an array.

Forming an array of the transport modules is advantageous in that it hereby is possible to design very complex transport patterns enabling efficient multidirectional transport in all directions through the system. It should be noted that such an array could comprise empty spaces or areas or it could comprise other types of modules such as weighing modules, one directional transport modules or other.

In an aspect of the invention, said trays comprises communication means for wirelessly communicating information from said tray to said transport modules.

It is advantageous to make the trays comprises communication means in that it hereby is possible for the transport system to obtain information on the given trays identity, load, destination and/or other. And doing this wirelessly ensures efficient, simple and quick communication of this information.

The invention further provides for a method for moving goods around in a modular transport system. The method comprises the steps of:
- arranging a number of transport modules side-by-side so that an upper side of the modules together form a transport plane, wherein the modules includes one or more multidirectional drive means enabling transport in substantially any direction in the transport plane,
- placing the goods on a tray in an initial position in the transport system, wherein the tray is placed on one or more of the transport modules,
- transporting the tray from the initial position to a desired position by means of the transport modules,
- detecting the orientation of the tray in relation to the transport modules,
- adjusting the orientation of the tray in relation to the modules by means of the one or more multidirectional drive means of one or more transport modules.

Adjusting the orientation of the tray in relation to the modules—on the basis of a detection of the orientation of the tray which would be compared with a desired or predetermined orientation—is advantageous in that the risk of goods colliding with each other, beams, processing equipment and other is reduced.

In an aspect of the invention, said orientation is adjusted on the fly while said tray is transported from said initial position to said desired position.

Adjusting the orientation of the trays on the fly will increase the overall capacity of the system in that the goods can change orientation simultaneously with being transported—from A to B in a controlled fashion—so that when it reaches its destination it is already in the right orientation.

In an aspect of the invention, said method further comprises the step of said transport system regularly negotiating the preferred route between the current position of said tray and said desired position.

It is advantageous that the system comprises means for negotiating the preferred route constantly or at least regularly so that if the initial route becomes obstructed by other trays, breakdowns of modules or other a new preferred route can quickly be negotiated and thus ensure a high capacity of the system even when it is heavily loaded.

In an aspect of the invention, said orientation is detected while said tray is transported.

Detecting the orientation of the tray while it is in motion is advantageous in that it reduces the transportation time and thus increases the capacity of the transport system.

In an aspect of the invention, said method further comprises the step of detecting the position of said tray in said transport system.

Hereby is achieved an advantageous embodiment of the invention.

In an aspect of the invention, two or more of said transport modules are arranged to jointly displace trays that cover an area bigger than the area of one of said modules.

If the transport system needs to transport goods that is bigger than a single module such goods would typically be transported on a tray e.g. substantially having the size of two transport modules, four transport modules or other. In such a case neighboring modules will have to collaborate in moving the goods around.

FIGURES

Figure 2:
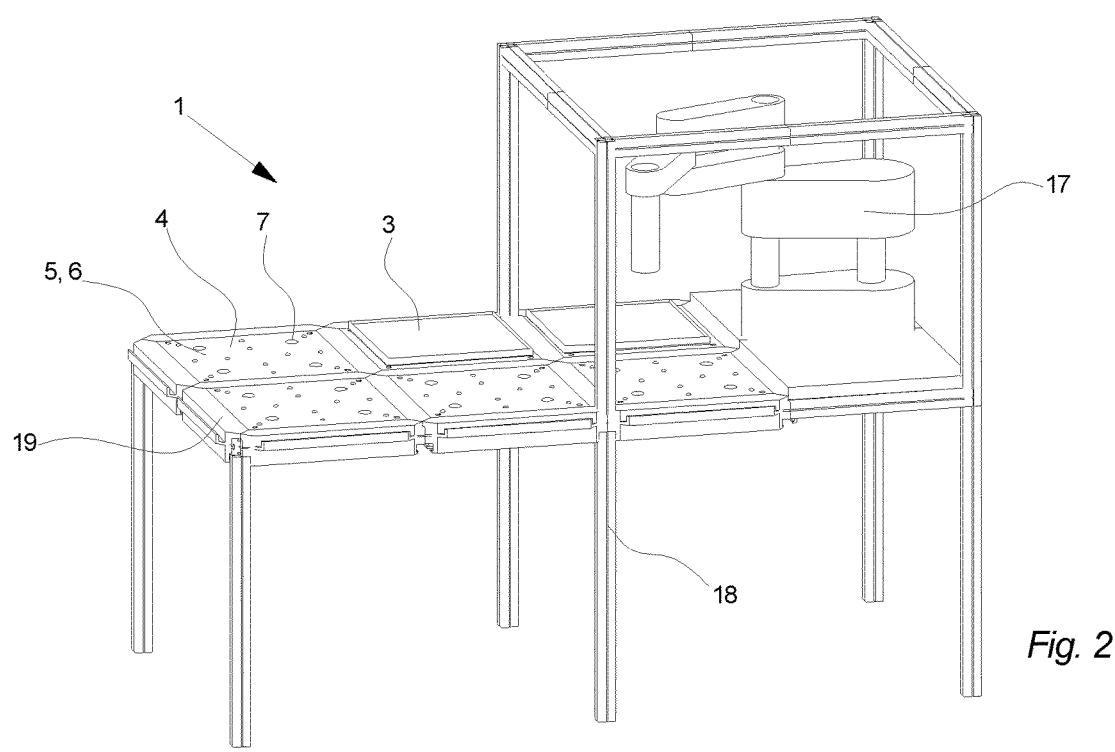
Figures 3, 4:
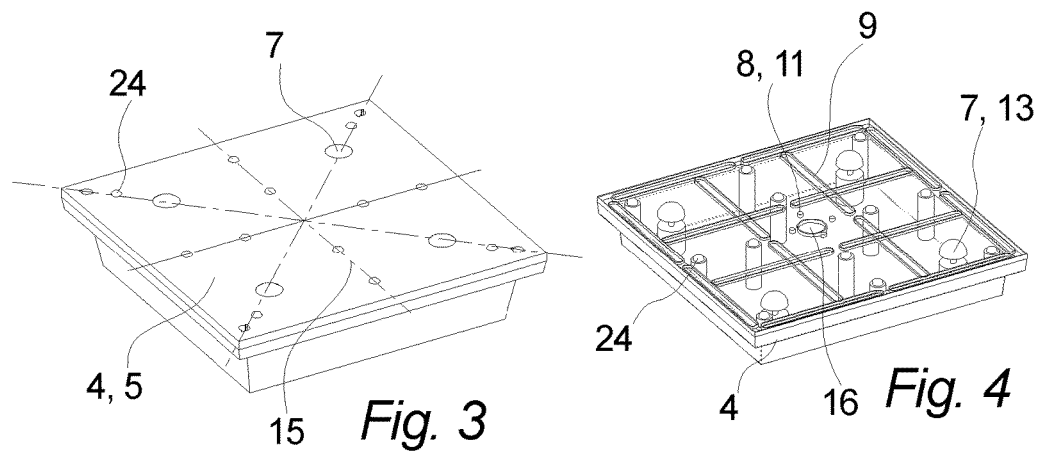
Figure 5:
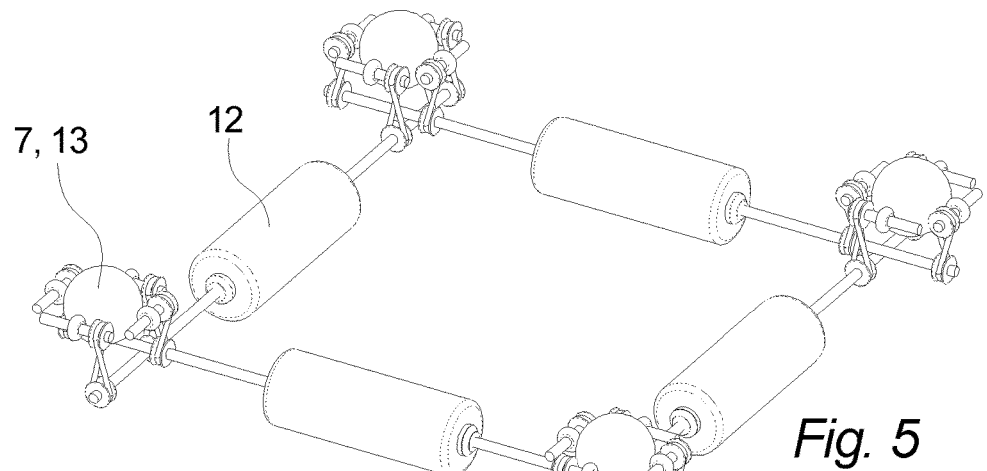
Figures 6, 7:
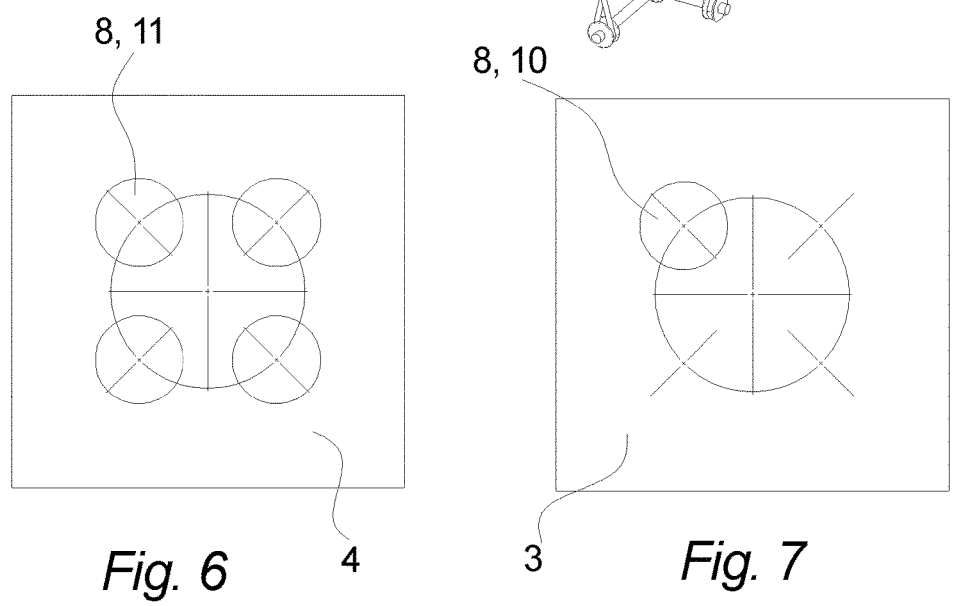
Figure 8:
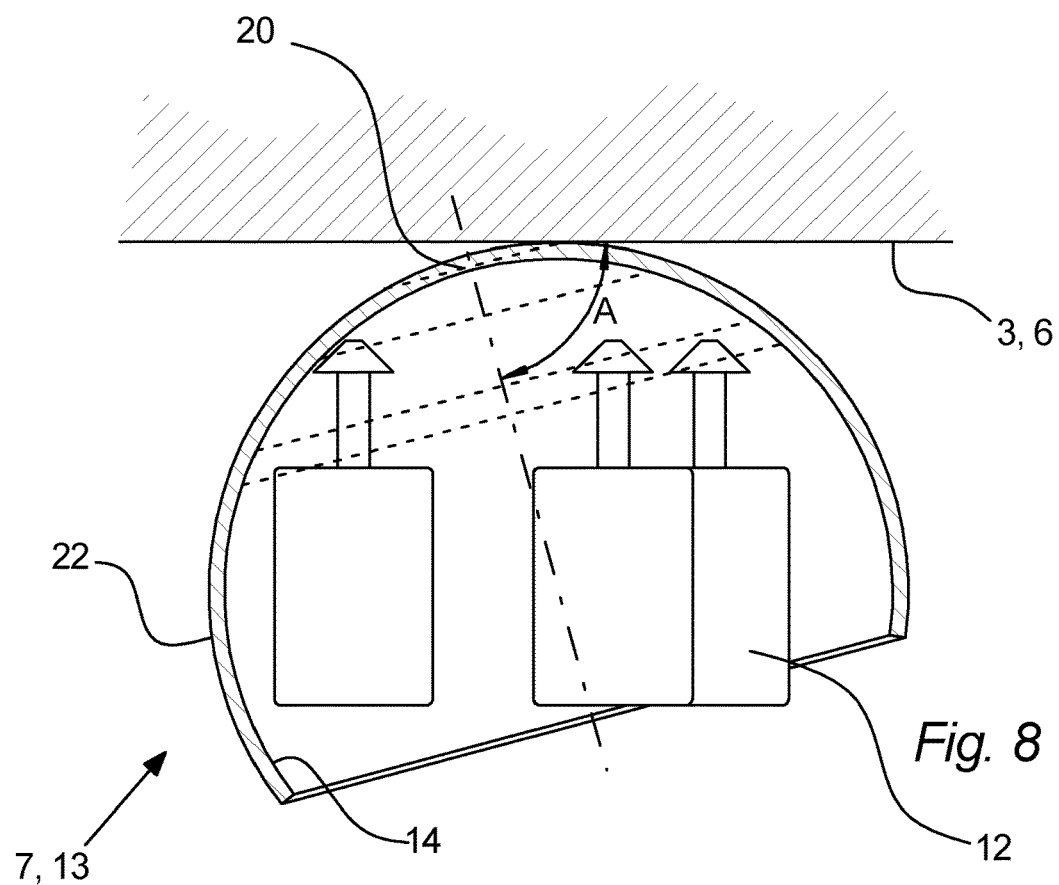
Figure 9:
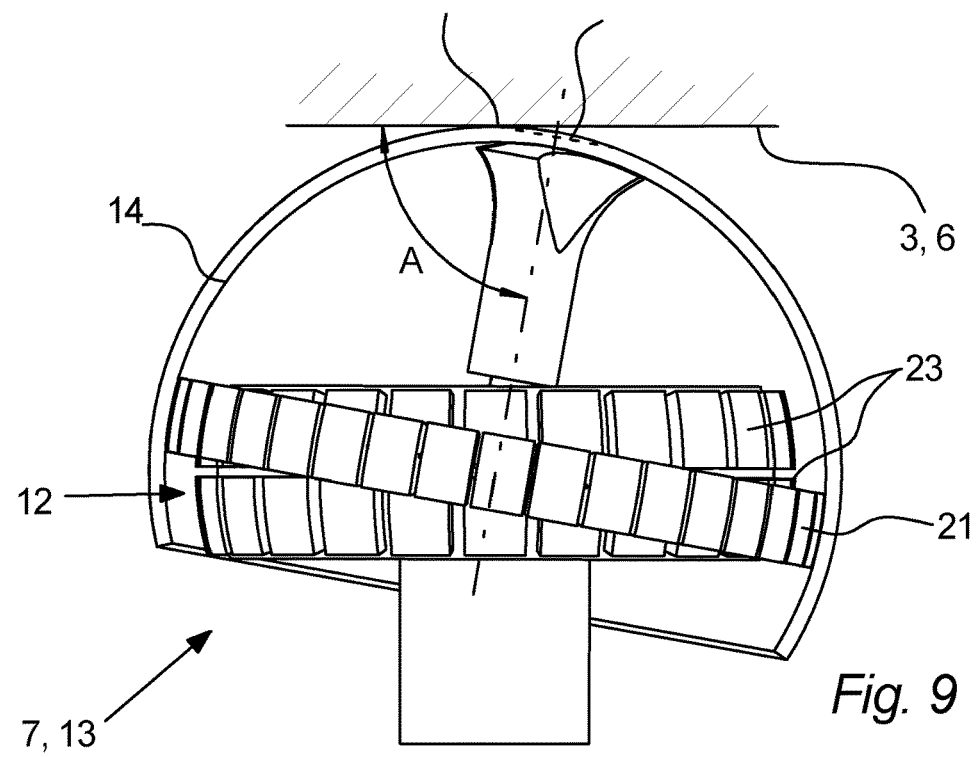
Figure 10:
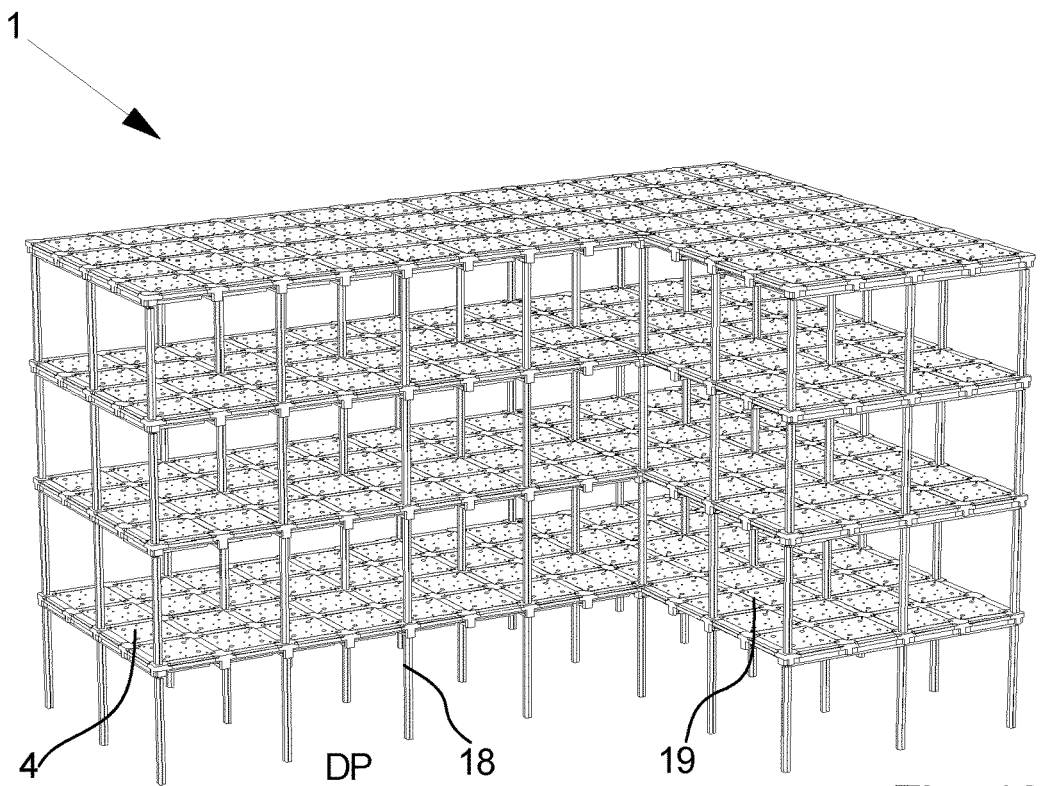
Figure 11:
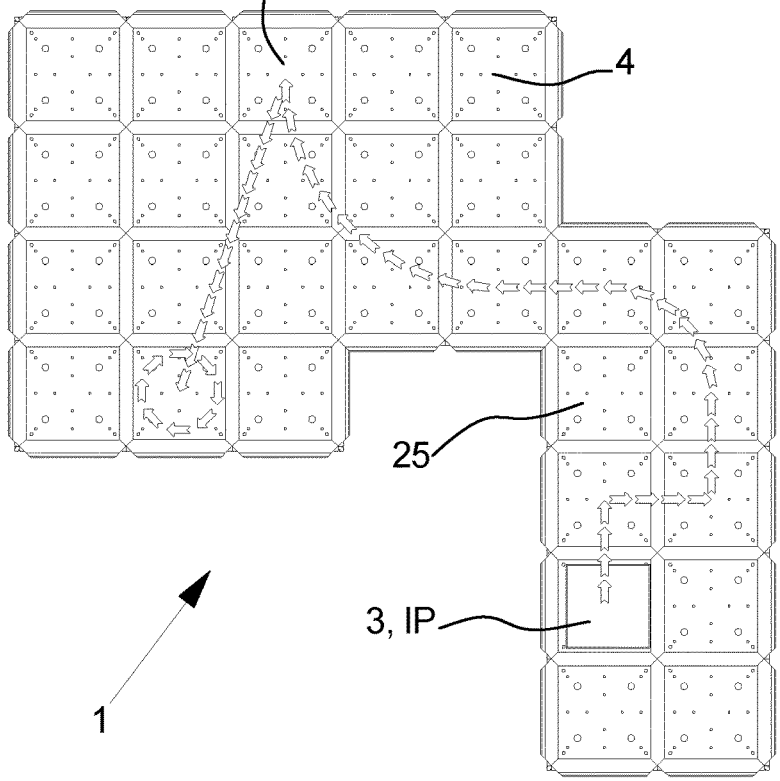

The invention will be described in the following with reference to the figures in which FIG. 1 illustrates an embodiment of a transport system comprising trays with different goods, as seen in perspective, FIG. 2 illustrates a part of a transport system and a processing station, as seen in perspective, FIG. 3 illustrates an embodiment of a transport module, as seen in perspective, FIG. 4 illustrates the transport module of FIG. 3 without the top plate, as seen in perspective, FIG. 5 illustrates an embodiment of multidirectional drive means comprising multidirectional driving balls driven by common motors, as seen in perspective, FIG. 6 illustrates an embodiment of tray orientation detection means as arranged in a transport module, as seen from the top, FIG. 7 illustrates an embodiment of tray orientation detection means as arranged in a tray, as seen from the bottom, FIG. 8 illustrates a cross section through an embodiment of a multidirectional driving ball being driven by three motors, as seen from the side, FIG. 9 illustrates a cross section through an embodiment of a multidirectional driving ball comprising an integrated motor, as seen from the side, FIG. 10 illustrates a multi storey transport system, as seen in perspective, and FIG. 11 illustrates an example of a transport path of a tray in a transport system, as seen from above.

DETAILED DESCRIPTION OF THE INVENTION

FIG. 1 illustrates an embodiment of a transport system 1 comprising trays 3 with different goods 2, as seen in perspective.

As illustrated the transport system 1 can be used for transporting a multitude of different goods around in the transport system. Examples of goods could be washing machines and other domestic appliances, hi-fi equipment, food stuff, luggage or many other things that need to be transported internally between different locations e.g. in a sorting process, a storage process, a manufacturing process, a processing process or other.

In this embodiment the goods 2 are placed on transport trays 3 so that the transport trays 3 acts as a uniform interface between the goods 2 and the transport modules 4.

In this embodiment the trays 3 are formed with different sizes i.e. some trays 3 have a size substantially equivalent to the size of a single transport module 4, some trays 3 have a size substantially equivalent to the size of two transport modules 4, some trays 3 have a size substantially equivalent to the size of four transport module 4 and so on. The trays 3 are formed with different sizes to accommodate goods 2 of different sizes and there is therefore substantially no limit to the number of modules 4 a single tray 3 can cover—it all depends on the specific use and the size of the modules 4.

In another embodiment the goods 2 could be arranged on shelves, frames or other connected to the tray 3 or the trays 3 could be used for transporting bulk material or supplying bulk material to processing stations, wherein the bulk material is to be used for processing other goods 2 being transported around in the transport system 1.

In this embodiment all the transport modules 4 are substantially identical but in another embodiment one or more of the modules 4 could be provided with special properties, such as being provided with weighing means, shape scanning means, lifting or lowering means or other. The trays 3 could also be used for carrying parts under assembly, tools for processing stations, parts in stock and any other thing.

In this embodiment the transport system 1 comprises a frame 18 on which a number of interconnection modules 19 are mounted on the frame beams extending between the transport modules 4. The interconnection modules 19 enables that the transport modules 4 can communicate with other transport modules 4, with a superior control unit or other and the interconnection modules 19 can distribute power in the transport system. In another embodiment this distribution of data and/or power could instead or also be integrated in the frame 18 or other distribution means.

In another embodiment the transport modules 4 could also be directly coupled to each other either electrically, mechanically or both—i.e. in another embodiment the modules 4 would be electrically coupled directly to each other by some sort of plug means and/or the modules 4 would be mechanically coupled directly to each other so that the frame 18 could be completely or partly omitted.

The present transport system 1 is a modular transfer system for internal transport. Basically the system 1 is based on stationary transport modules 4 that can move trays 3 in any direction and rotate the trays 3.

Trays 3 of different sizes can be moved on the same system 1 at the same time and each tray 3 are moved with its own speed, acceleration, deceleration and turning torque, and it follow its own path.

In this embodiment every tray 3 has an electronic memory. To move a tray from one position to a new position the destination address is wirelessly communicated to the tray memory and the system 1 has enough information to take care of the movement of the tray 3 to the new destination. It is hereby simple to assemble goods 2 consisting of many parts and many operations. Just store the assembly recipe in the tray 3 and the system 1 moves the tray 3 from operation to operation.

However in another embodiment the trays 3 would not comprise a memory and the logistic would be directed by a superior control unit.

FIG. 2 illustrates a part of a transport system 1 and a processing station 17, as seen in perspective.

In this embodiment the transport system 1 is used for transporting goods 2 around in a manufacturing plant and in this embodiment at least some of the transported goods 3 needs to be processed by means of a robot.

FIG. 3 illustrates an embodiment of a transport module 4, as seen in perspective.

As explained e.g. in relation with FIG. 11 the transport system usually comprises an array of transport modules 4 aligned in the same height so that the upper face 5 of all the modules 4 together forms a transport plane 6.

In this embodiment the module 4 is square i.e. in this embodiment the modules 4 comprises four axis of symmetry 15 but in another embodiment the modules 4 could be rectangular—with one or two axis of symmetry, hexagonal—with three axis of symmetry or other.

FIG. 4 illustrates the transport module 4 of FIG. 3 without the top plate, as seen perspective.

In this embodiment the module 4 is provided with a relatively large number of position detection means 9 to ensure a relatively precise detection of the current position of the trays 3. In another embodiment these position detection means 9 could be supplemented or even replaced by position detection means 9 arranged e.g. in the interconnection modules or in another way external to the modules 4.

In this embodiment the module 4 also comprises tray orientation detection means 8 in the form of four Hall Effect sensors arranged to detect a magnet on the tray 3 but in another embodiment the tray orientation detection means 8 could comprise camera means, audio sensor means, other types of sensors or any combination thereof.

In the middle of the module 4 is in this embodiment arranged data communication means 16 in the form of a coil for wirelessly Near Field Communication with the tray 3. However, in another embodiment data could be communicated differently e.g. by means of some sort of collector shoe-like arrangement.

In this embodiment the module 4 also comprises a number of support means 24 in the form of support balls capable of free rotation in all directions. However, in another embodiment the module 4 would not comprise support means 24—e.g. if the support means 24 was arranged on the interconnection modules, on the frame 18 or elsewhere or if the system 1 did not comprise support means 24.

In another embodiment the support means 24 could also or instead comprise some sort of stationary low-friction material or be enabled in another way.

In this embodiment the module 4 is provided with multidirectional drive means 7 in the form of four evenly spaced and symmetrically arranged multidirectional driving balls 13. In this case the multidirectional driving balls 13 are of the type disclosed in FIG. 9 but in another embodiment the multidirectional driving balls 13 could be enabled in another way such as it is disclosed in FIG. 5 and FIG. 8 or in another way. Or the multidirectional drive means 7 could instead or also be formed by chains, conveyer belts, timing belts or other arranged on means for changing the flow direction of these linear transport means or in a multitude of other ways.

In another embodiment each module 4 could comprise fewer multidirectional drive means 7 such as one, two or three or each module 4 could comprise more multidirectional drive means 7 such as five, six, nine or more.

FIG. 5 illustrates an embodiment of multidirectional drive means 7 comprising multidirectional driving balls 13 driven by common motors 12, as seen in perspective.

In this embodiment four motors 12 cooperates to drive four multidirectional driving balls 13 and by individually controlling the rotational speed of the motors 12 the transport direction of the driving balls 13 are able to drive a tray 3 in any direction.

FIG. 6 illustrates an embodiment of tray orientation detection means 8 as arranged in a transport module 4, as seen from the top and FIG. 7 illustrates an embodiment of tray orientation detection means 8 as arranged in a tray 3, as seen from the bottom.

In this embodiment the modules 4 is provided with four evenly spaced and symmetrically arranged tray orientation detection means 8 in the form of Hall Effect sensors arranged to detect tray orientation detection means 8 of the tray 3 in the form of a single magnet arranged in a quadrant of the tray 3 so that the orientation of the tray 3 can be detected based on the output of the Hall Effect sensors when the tray 3 is located above the module 4.

FIG. 8 illustrates a cross section through an embodiment of a multidirectional driving ball 13 being driven by three motors 12, as seen from the side.

In this embodiment three motors 12 are arranged in the same distance from the transport plane 6 and the motors 12 are all identically. Thus, when the motors 12 all rotate at the same speed the spherical ball part 22 will rotate around a rotational axis being perpendicular to the transport plane 6 i.e. the tilt angle A is 90° and in this embodiment the spherical ball part 22 therefore rotates around a vertical axis.

However, when a difference is established between the rotational speeds of the three motors 12 the rotational axis of the spherical ball part 22 is tilted—e.g. to 80° as illustrated. As soon as the rotational axis of the spherical ball part 22 differs from 90°, the ball part 22 will be able to move a tray 3 touching the ball 13 in the apex, in that the rotation of the ball 13 will form an endless circle of contact points between the ball surface and the tray 3 as illustrated by the contact circle 20. The diameter of the contact circle 17 will change in accordance with the tilt angle A of the rotational axis of the spherical ball part 22 hereby providing the multidirectional driving ball 13 with a gearing which can be adjusted stepless by adjusting the difference between the rotational speeds of the motors 12.

A further advantage of this type of multidirectional driving ball 13 is that when the motors 12 are stopped and the spherical ball part 22 is therefore not rotating, the ball 13 is locked for rotation in practically any direction.

FIG. 9 illustrates a cross section through an embodiment of a multidirectional driving ball 13 comprising an integrated motor 12, as seen from the side. Only the front half of the ball 13 is removed to provide a better look at the inside of the multidirectional driving ball 13.

In this embodiment of the invention a number of rotor magnets is attached to the inside surface 14 of the spherical ball part 22 to form a rotor 21 of an electrical motor 12. Preferably the rotor magnets are permanent magnets but in principle the rotor magnets could be electro magnets.

The rotor magnets are arranged in a single circular row inside the spherical ball part 2 but in another embodiment the rotor magnets could be arranged in two, three or more circular rows being mutually displaced in the axial direction of the rotor 21 on the inside surface 18 of the spherical ball part 22.

Inside the rotor 21 is arranged a stator 23 of the electrical motor 12 in that a number of stator magnets are arranged in two circular rows being mutually displaced in the axial direction of the stator 23. In another embodiment the stator 23 could comprise three, four or more circular rows.

In this embodiment the stator magnets 23 are electro magnets and by activating the electro magnets in the right order at the right frequency it is possible to drive a rotation of the rotor 21 in relation the stator 23 as it is well known from electrical motors known in the art. However, by engaging some of the electro magnets in both of the circular rows of stator magnets simultaneously or in the right order it is possible to also control the tilt angle A between the stator 23 and the rotor 21 and thereby between the spherical ball part 22 and the tray 3 to enable that the spherical ball part 22 moves the tray 3 along in any direction in the transport plane 6.

FIG. 10 illustrates a multi storey transport system 1, as seen in perspective.

The present transport system 1 enables that the arrays of modules 4 can be arranged in several layers to efficiently use the given space also in the height. In this embodiment the modules 4 could also comprise corner post detection means (not disclosed) to detect if a post is placed at one or more of the modules corners and thus prevent that the trays 3 or goods 2 collide with a post.

In an embodiment the multi storey transport system 1 would comprise slides, elevators or other kinds of vertical displacement means (not disclosed) enabling that the trays 3 also could be transported freely between the different storeys.

FIG. 11 illustrates an example of a transport path of a tray 3 in a transport system 1, as seen from above.

In this embodiment a number of neighboring modules 4 together form an array, in which the trays 3 can be moved substantially in any direction, In this embodiment an empty tray 3 starts out in an initial position IP. At this initial position IP goods 2 are placed on the tray 3 and the trays memory is via the communication means 16 provided with information on the desired destination DP or possibly the entire route around the transport system 1 that the goods 2 need to take before it can leave the system 1 again. As soon as the module 4 receives the information from the tray 3 regarding its desired position DP the modules 4 can start negotiation a preferred route from the initial position IP to the desired position DP. As illustrated by the arrows in FIG. 11 the multidirectional drive means 7 enables that the path of the tray 3 can follow substantially any curve with or without rotating the tray 3 during the transport. If the tray 3 during its transport runs into a blocked module 25—e.g. due to breakdown, occupied by other trays or other—it will quickly negotiate an alternate route.

Once the tray 3 has reached its desired position DP, this desired position DP now becomes a new initial position and the route to a new desired position can be negotiated.

It should be noted that in an embodiment the module array could comprise empty spaces and/or module spaces could be occupied by processing means, support columns or other.

The invention has been exemplified above with reference to specific examples of designs and embodiments of transport trays 3, modules 4, multidirectional drive means 7, tray orientation detection means 8 etc. However, it should be understood that the invention is not limited to the particular examples described above but may be designed and altered in a multitude of varieties within the scope of the invention as specified in the claims.

LIST

1. Modular transport system
2. Goods
3. Transport trays
4. Module
5. Upper side of module
6. Transport plane
7. Drive means
8. Tray orientation detection means
9. Position detection means
10. Passive part of tray orientation detection means
11. Active part of tray orientation detection means
12. Motor
13. Multidirectional driving ball
14. Inside surface of hollow spherical ball part
15. Axis of symmetry of transport module
16. Communication means
17. Processing station
18. Frame
19. Interconnection modules
20. Contact circle
21. Rotor
22. Spherical ball part
23. Stator
24. Support means
25. Blocked module
IP. Initial position
DP. Desired position
A. Tilt angle

The invention claimed is:

1. A modular transport system for transporting goods around said system, said transport system comprising:
    two or more transport modules arranged side-by-side so that an upper side of said modules together form a transport plane,
    wherein each of said modules includes one or more multidirectional drives for transporting transport trays in substantially any direction in said transport plane; and
    wherein said trays and said modules comprises a tray orientation detector for detecting the orientation of said tray in relation to said modules.

2. A modular transport system according to claim 1, wherein said trays and/or said modules comprises position detection means for detecting the position of said tray in said transport system.

3. A modular transport system according to claim 1, wherein said trays comprise a passive part of said tray orientation detector and wherein said transport modules comprise an active part of said tray orientation detector.

4. A modular transport system according to claim 1, wherein each of said modules includes two or more multidirectional drives and wherein at least two of said two or more multidirectional drives are driven by the same motor.

5. A modular transport system according to claim 1, wherein said one or more multidirectional drives comprises multidirectional driving balls.

6. A modular transport system according to claim 5, wherein said multidirectional driving balls comprises a hollow spherical ball part including at least one motor arranged to drive said ball part through an inside surface of said hollow spherical ball part.

7. A modular transport system according to claim 1, wherein said transport modules comprise one or more axis of symmetry in said transport plane.

8. A modular transport system according to claim 1, wherein said transport system comprises a plurality of transport modules arranged side-by-side to form an array.

9. A modular transport system according to claim 1, wherein said trays comprises a communicator for wirelessly communicating information from said tray to said transport modules.

10. A method for moving goods around in a modular transport system, said method comprising the steps of:
    arranging a number of transport modules side-by-side so that an upper side of said modules together form a transport plane, wherein said modules includes one or more multidirectional drives enabling transport in substantially any direction in said transport plane,
    placing said goods on a transport tray in an initial position in said transport system, wherein said transport tray is placed on one or more of said transport modules,
    transporting said tray from said initial position to a desired position by means of said transport modules,
    detecting the orientation of said tray in relation to said transport modules, and
    adjusting the orientation of said tray in relation to said modules by means of said one or more multidirectional drives of one or more transport modules.

11. A method according to claim 10, wherein said orientation is adjusted on the fly while said tray is transported from said initial position to said desired position.

12. A method according to claim 11, wherein said method further comprises the step of said transport system regularly negotiating a preferred route between the current position of said tray and said desired position.

13. A method according to claim 10, wherein said orientation is detected while said tray is transported.

14. A method according to claim 10, wherein said method further comprises the step of detecting the position of said tray in said transport system.

15. A method according to claim 10, wherein two or more of said transport modules are arranged to jointly displace trays that cover an area bigger than the area of one of said modules.

* * * * *